T. L. RAMSEY.
WHEEL.
APPLICATION FILED AUG. 7, 1909.
991,645.
Patented May 9, 1911.
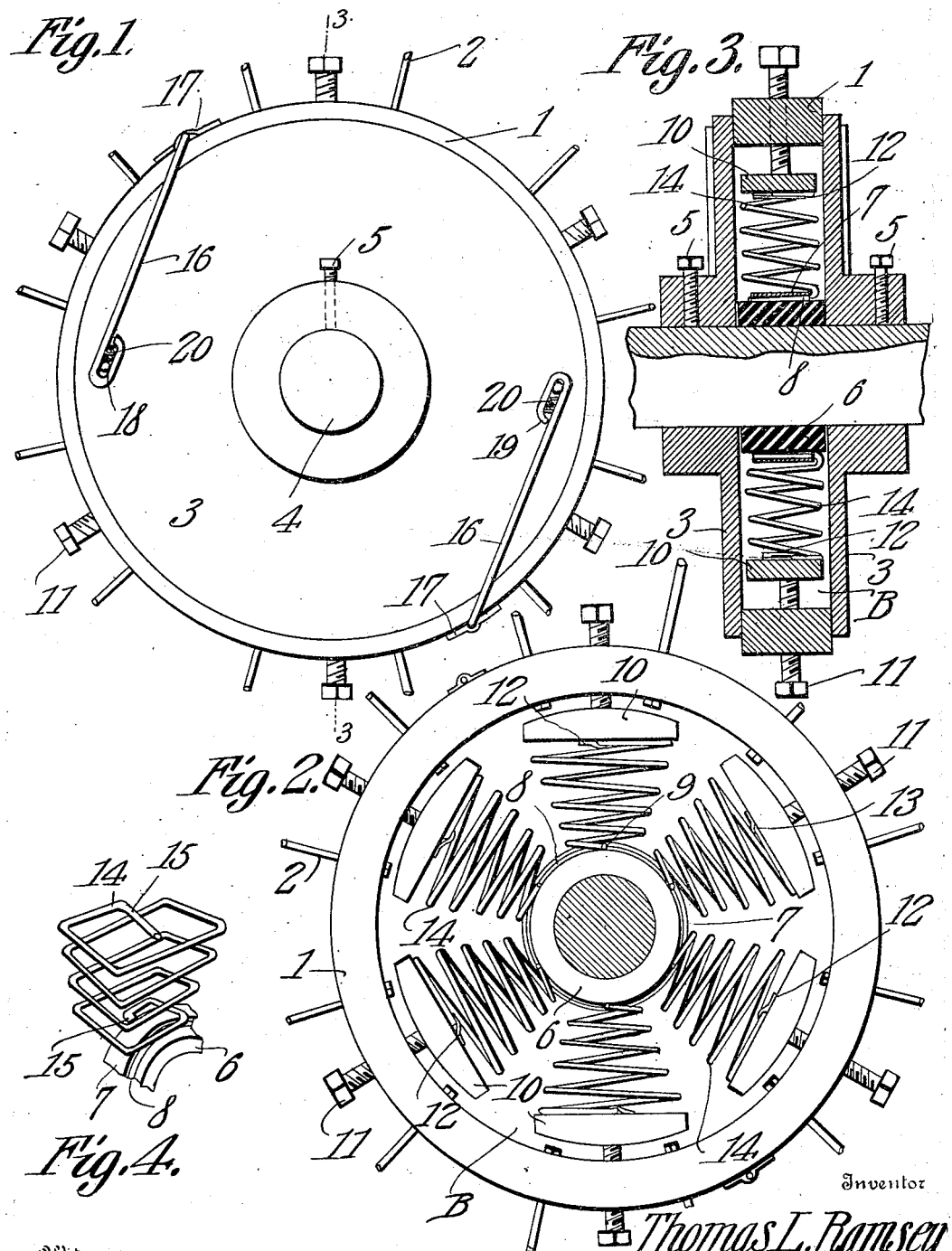

UNITED STATES PATENT OFFICE.

THOMAS L. RAMSEY, OF MIDDLEGROVE, ILLINOIS, ASSIGNOR OF ONE-HALF TO ALBERT P. BOND, OF MIDDLEGROVE, ILLINOIS.

WHEEL.

991,645.  Specification of Letters Patent.  Patented May 9, 1911.

Application filed August 7, 1909.  Serial No. 511,774.

*To all whom it may concern:*

Be it known that I, THOMAS L. RAMSEY, a citizen of the United States, residing at Middlegrove, in the county of Fulton and State of Illinois, have invented a new and useful Wheel, of which the following is a specification.

This invention relates to new and useful improvements in spring hubs, more particularly adapted to wheels of motor driven vehicles, and is designed to provide a wheel of this type and character that will be compact in its form, effective in its use and cheap to manufacture.

It contemplates the construction of a hub having the spring elements loosely connected with the axle, and approximately filling in the space designated for the same.

A further more important object is the provision of a set screw, whereby the resiliency and tension of the springs may be regulated by a bearing plate.

A still further object is a means for transmitting the power from the axle to the felly of the wheel in a motor driven vehicle without in any way straining the springs.

With the above and other objects in view the invention consists in the construction, combination and arrangement of parts hereinafter fully described, specifically claimed and illustrated in the accompanying drawings wherein:—

Figure 1 is a side elevation of a hub constructed after my improved method showing in detail the means whereby power is transmitted from the axle to the felly of the wheel. Fig. 2 is a similar view with one of the side retaining plates removed. Fig. 3 is a transverse cross section taken on the line 3—3 of Fig. 1. Fig. 4 is a perspective view of a section of the axle bearing and a spring constructed after my improved method.

The spring hub forming the subject matter of the present invention comprises a steel ring 1 having the spokes 2 radiating therefrom and the side plates 3 rigidly secured to the axle 4 by the set screws 5 forming in combination therewith an approximately hollow drum.

A concentrically disposed band 6 formed of leather or any similar antifriction material is loosely mounted on the axle 4. A pair of metal rings 7 and 8 surround the band 6. The ring 8 is formed with transverse orifices or openings 9 to receive the transversely bent inner ends of springs 14. Oppositely disposed to said transverse orifices 9 are the bearing blocks 10 operated by set screws 11 piercing the ring 1 and having the bands 12 secured to their inner faces and bent into loops 13. These bearing blocks are of slightly convex structure in order that the same may obtain approximately the curvature of the outer ring 1 and as a result allow greater adjustment for the springs 14 interposed between said blocks and the band 6.

The springs 14 are pyramidal coil springs, being of such construction that they may approximately fill the space indicated in general as B formed between the plates, having each terminal thereof bent inwardly across the axis of the spring to form the arms 15 which are engaged at the base by the loop 13 on the bearing block and at the apex by the transverse openings 9 in the ring 8.

In order to provide a means whereby power may be transmitted from the axle to the outer ring 1, the plates 3 are keyed rigidly to the axle 4 and rotate therewith, and the latter revolves the ring 1 through the instrumentality of the U-shaped draw bars 16, each arm of which extends to engage one of said plates 3, while the base is rigidly secured to the outer ring 1, where it is rigidly secured by the plate 17. The arms are looped at their ends and the loops are engaged by the pins 18 carried on the plates 3 and are so constructed that a spring 20 may be interposed between each pin and inwardly bent terminal 19, thus eliminating all jars which might arise from starting or stopping the vehicle.

A wheel of this construction possesses sufficient resiliency for all classes of vehicles and power can be transmitted from the axle to the wheel through the plates 3 and rod 16 without straining or breaking the springs. It will be also seen that through the instrumentality of the set screw 11 the resiliency of the springs may be regulated to conform with the load carried by the vehicle, and that said springs being of pyramidal construction approximately fill the space B.

Having thus fully described my invention what I claim as new and desire to secure by U. S. Letters Patent is:—

In a resilient hub of the class described, the combination with an axle, of a concentrically disposed inner band loosely mounted on the said axle, said band being constructed of approximately anti-friction material, superimposed rings around said band, whereof the innermost has transverse orifices formed therein, an outer ring concentrically spaced from said inner rings, and having set screws therein, convex bearing plates operated by said set screws, and having transverse loops on their inner faces, pyramidal coil springs interposed between said inner rings and bearing plates and having arms at their ends engaging said orifices and loops, side retaining disks rigidly secured to said axle, and U-shaped draw bars transversely disposed on said outer ring and having their arms resiliently secured to said side disks.

In testimony that I claim the foregoing as my own, I have hereto affixed my signature in the presence of two witnesses.

THOMAS L. RAMSEY.

Witnesses:
  CHAS. NEUCOMB,
  ALDEN G. SAUNDERS.